UNITED STATES PATENT OFFICE.

FRANZ HERRMANN, OF ISERTHAL, AUSTRIA-HUNGARY.

PROCESS OF MAKING ARTIFICIAL STONES OF SMALL SIZE FOR TOYS, &c.

SPECIFICATION forming part of Letters Patent No. 527,059, dated October 9, 1894.

Application filed April 5, 1894. Serial No. 506,420. (No specimens.)

*To all whom it may concern:*

Be it known that I, FRANZ HERRMANN, manufacturer, a subject of the Emperor of Austria-Hungary, residing at Iserthal, in the Province of Bohemia, in the Empire of Austria-Hungary, have invented certain new and useful Improvements in Processes of Making Artificial Stones of Small Size for Toys and other Goods; and I do hereby declare the following to be a full, clear, and exact description of the invention, such as will enable others skilled in the art to which it appertains to make and use the same.

This invention relates to a process of making stone-articles of a rather small size for toys, for domestic use, for the use in schools, and other goods intended to be produced in large quantities.

The stone-composition is made of one part of quartz, one-half part of talc, one part of china clay, two parts of calcined carbonate of magnesium or magnesia. These materials having been most finely ground and mixed, a solution of chloride of magnesium of 19° Baumé is added to the mixture in the proportion of twenty per cent. of the total weight of the mixture, and, in the case of colored stones, the dry coloring material, in a finely ground state must also be added to the mixture. Thereupon the whole mass is thoroughly mixed, until it forms a homogeneous moist powder, which conglobulates easily. As a red coloring material I use Pompeian red, as a yellow one ocher, as a blue one blue ultramarine, &c. Of course only such colors, have to be chosen which cannot be injurious to the health. According to the desired intensity of the color the addition of coloring material amounts to from three to twenty per cent. of the total weight. The above mentioned somewhat moist powder is then introduced in metallic molds and submitted to pressure up to five hundred atmospheres. The bodies formed by means of this high pressure are then removed from the molds and left to the subsequent hardening. In a few days the hardening has proceeded to such a degree, that the bodies are fit for use.

I claim—

1. The method of forming artificial stones consisting in mixing finely powdered quartz, talc, china clay and magnesia in substantially the proportions specified, treating the resultant compound with a solution of chloride of magnesium to form a moist powder, and then pressing the same in molds and leaving it to harden, substantially as described.

2. The herein described compound for artificial stone consisting of finely powdered quartz, talc, china clay and magnesia and a solution of chloride of magnesium in substantially the proportions specified, substantially as described.

In testimony whereof I affix my signature in presence of two witnesses.

FRANZ HERRMANN.

Witnesses:
 LUCIUS HERNDON,
 EDWARD HIRSCH.